United States Patent [19]
Deserno et al.

[11] 3,830,558
[45] Aug. 20, 1974

[54] NON-LINEAR OPTICAL COMPONENT

[75] Inventors: Ulrich Deserno, Munich; Siegfried Haussuehl, Cologne, both of Germany

[73] Assignee: Siemens Aktiengesellschaft, Berlin & Munich, Germany

[22] Filed: Feb. 14, 1973

[21] Appl. No.: 332,312

Related U.S. Application Data

[63] Continuation-in-part of Ser. No. 234,970, March 15, 1972, abandoned.

[30] Foreign Application Priority Data
  Mar. 26, 1971  Germany.............................. 2114823

[52] U.S. Cl............. 350/160, 307/88.3, 331/94.5 N
[51] Int. Cl. .............................................. G02f 1/40
[58] Field of Search................ 307/88.3; 350/160 R; 331/94.5 M, 94.5 N

[56] References Cited
UNITED STATES PATENTS
| | | | |
|---|---|---|---|
| 3,457,417 | 7/1969 | Buchsbaum................ | 331/94.5 N X |
| 3,586,997 | 6/1971 | Kinsel............................ | 331/94.5 M |

*Primary Examiner*—John K. Corbin
*Assistant Examiner*—Paul K. Godwin
*Attorney, Agent, or Firm*—Hill, Gross, Simpson, Van Santen, Steadman, Chiara & Simpson

[57] ABSTRACT

A non-linear optical component for use in laser systems providing frequency conversion, detection and modulation of electromagnetic radiation. The component is a monocrystal of barium nitrite hydrate, [Ba(NO$_2$)$_2$·H$_2$O] and includes a pair of electrodes mounted on opposite surfaces of the component.

5 Claims, 3 Drawing Figures

NON-LINEAR OPTICAL COMPONENT

CROSS-REFERENCE TO RELATED APPLICATION

This is a continuation-in-part application of U.S. Ser. No. 234,970, filed Mar. 15, 1972, now abandoned and which is incorporated herein by reference.

BACKGROUND OF THE INVENTION

1. Field of the Invention

The invention relates to non-linear optical components and more particularly to monocrystal non-linear optical components for electro-magnetic radiation in infra-red, visible and ultra-violet spectrum range.

2. Prior Art

Single crystals having non-linear dielectric properties are known for frequency control, such as production of frequency-doubled radiation. Examples of such crystals include ammonium dihydrogen phosphate (ADP), potassium dihydrogen phosphate (KDP) or lithium niobate ($LiNbO_3$) and they are characterized by dielectric constants that are a function of the strength of an applied electrical field. When a light of a given frequency is radiated into such a crystal, i.e., at the so-called fundamental wave frequency, light with frequencies that are harmonics of such frequency is obtained on the side of the crystal where the light emerges. However, prior art monocrystals lack efficiency.

SUMMARY OF THE INVENTION

The invention provides a non-linear optical component for electro-magnetic radiation in the infra-red, visible and ultra-violet spectrum range comprised of a monocrystal consisting essentially of barium nitrite hydrate. In preferred embodiments, the monocrystal component of the invention is provided with opposed electrodes for applying controlled voltage to the component. The optical component of the invention is useful in laser systems as a frequency converter, such as a phase-matched frequency-doubling component, a frequency-mixing component or a parametric frequency converting component, the component is also useful as a modulating device or as a detection device in optical or electro-optical systems.

DESCRIPTION OF THE PREFERRED EMBODIMENTS

The invention provides a non-linear optical component for electro-magnetic radiation in the infra-red, visible and ultra-violet spectrum range. The component is a mono or single crystal consisting essentially of barium nitrite hydrate [$Ba(NO_2)_2 \cdot H_2O$] and is characterized by an improved efficiency in light or electromagnetic radiation control in relation to prior art monocrystals.

In preferred embodiments, the non-linear optical component of the invention is provided with a means for applying a voltage thereto. In certain preferred forms, such means comprise a pair of electrodes mounted on opposing surfaces of the monocrystal component of the invention.

The monocrystal non-linear optical component of the invention is useful in various optical or electro-optical systems, such as in laser systems, as a frequency converting component, for example, a frequency-doubling component, a phase-matched frequency-doubling component, a frequency-mixing component or a parametric-frequency converting component for electro-magnetic radiation in the infra-red, visible and ultra-violet spectrum range. The non-linear monocrystal optical components of the invention is also useful in operational electrooptical systems as a modulating component for electro-magnetic radiation.

Further, the non-linear monocrystal optical component of the invention is also useful in operational electro-optical systems as a detection component for electro-magnetic radiation.

[$Ba(NO_2)_2 \cdot H_2O$] monocrystals have high non-linear tensor components for dielectric susceptibility. Such monocrystals also have the required optical characteristics, such as anistropy and dispersion necessary for phase-matching of primary and secondary electro-magnetic waves. Thus, the [$Ba(NO_2)_2 \cdot H_2O$] crystals of the invention are useful for phase-matched frequency-doubling, frequency-mixing and parametric-frequency conversion of electro-magnetic radiation with a high degree of efficiency. The phase adjustment is effected by the crystal in such a way that the dispersion occurring between the fundamental wave (or frequency) and a harmonic thereof is compensated by means of a suitable adjustment in the refraction-index difference between these waves. The refraction-index difference between a basic wave and a harmonic thereof occurs when the electric vector of both waves are orientated differently with respect to the crystal-coordinate system, apparently due to the optical anistropy of the crystal.

Monocrystals composed of [$Ba(NO_2)_2 \cdot H_2O$] are readily produced by conventional processes, such as by slow evaporation of an aqueous solution containing [$Ba(NO_2)_2 \cdot H_2O$] and a gradual lowering of temperature so that a desired monocrystal is attained. Once a suitable size crystal is attained, it is preferable to cut and polish the crystal surface in a conventional manner to attain a useful optical component.

Figure 1:
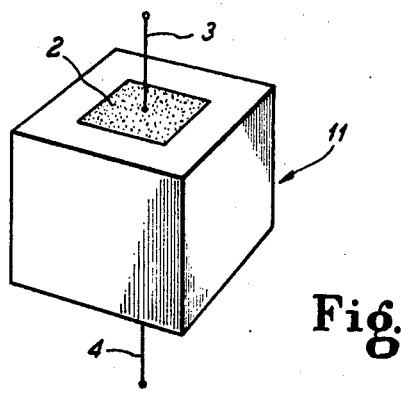
FIG. 1 is an elevated perspective view of the invention.

FIG. 1 illustrates a [$Ba(NO_2)_2 \cdot H_2O$] monocrystal or single crystal 11. An electrode 2 is provided on one surface thereof. A similar electrode (not shown) is provided on the opposing surface thereof. Conducting means 3 and 4 are operationally connected to the electrodes for communicating an electrical signal from a voltage source (not shown) so that a select signal can be applied to the component 11.

An adjustment of the refraction-index difference is readily effected by various means, for example, by rotating the monocrystal so that the angle orientation of the beam in respect to the optical axes of the monocrystal is changed; by an electro-optical effect, i.e., by applying a voltage to the crystal; by a piezo-optical effect; or by a temperature change.

The excellent transparency characteristics of the barium nitrite hydrate monocrystal optical component provided by the invention extends far beyond the visible spectrum range and allows such crystal to also have utility in the ultra-violet and infra-red spectrum range. In addition to frequency-doubling, frequency-mixing and parametric-frequency conversion, the monocrystal optical components of the invention are also useful in electro-optical systems for modulation, detection and- /or deflection of electro-magnetic radiations in an operational optical or electro-optical system.

Figure 2:
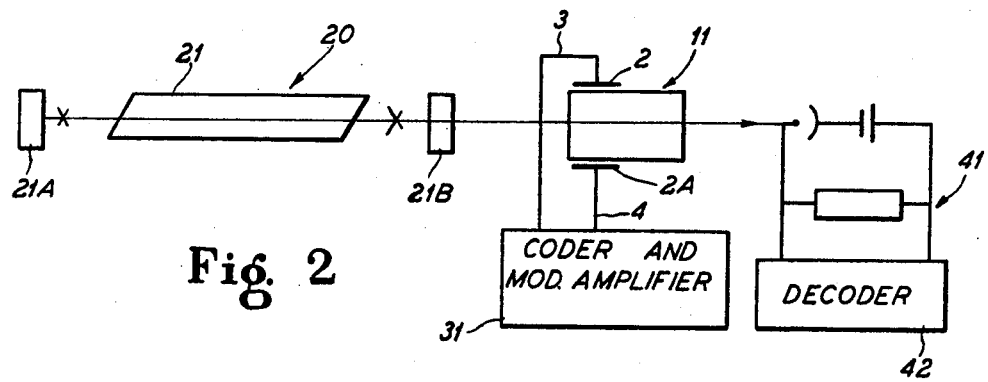
FIG. 2 is a schematic view of a laser communication system utilizing the monocrystal component of the invention for frequency modulation.

FIG. 2 illustrates an exemplary laser communication system 20, which includes the non-linear optical component 11 of the invention. The laser system 20 includes a gas discharge tube 21, which when operating provides optical radiation and a pair of mirrors 21A and 21B positioned to form an optical resonator, with mirror 21B allowing some radiation to pass therethrough in a conventional manner. The optical component 11 is positioned to receive the optical radiation passing through mirror 21B. An electrically modulated signal is supplied to electrodes 2 and 2A positioned in working relation to opposing surfaces of component 11 via conduits 3 and 4 from a suitable coder and modulation amplifier 31. The electrical signal causes component 11 to modulate the frequency of the optical radiation passing through its body. The modulated frequency is received by a photo-electric demodulator 41 and may be reconverted into electrical signals by decoder 42.

Figure 3:
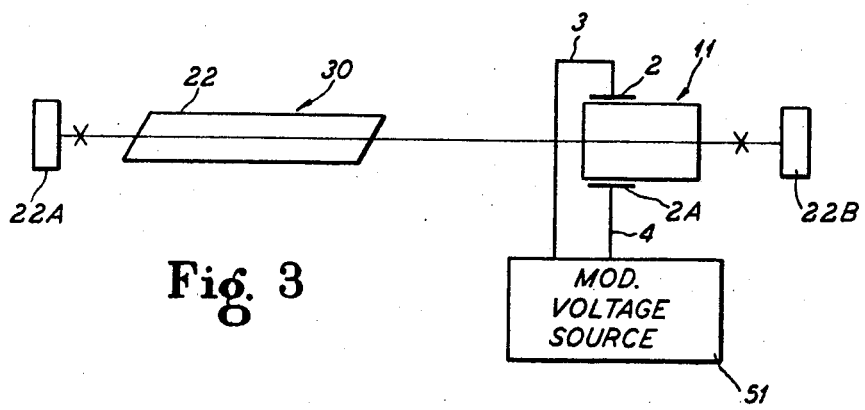
FIG. 3 is a schematic view of a laser system utilizing the optical component of the invention for frequency-doubling.

FIG. 3 illustrates an exemplary laser system 30 useful in experimental work for frequency-doubling process or phase-matched frequency-doubling by altering the initially produced optical radiation with the non-linear optical component 11 of the invention. The laser system 30 includes a gas discharge tube 22, which when operating provides optical radiation and a pair of mirrors 22A and 22B positioned to form an optical resonator. A monocrystal optical component 11, composed of [$Ba(NO_2)_2 \cdot H_2O$] is interposed between the discharge tube 22 and mirror 22B. A modulating voltage source 51 supplies a modulating voltage to electrodes 2 and 2A, which may be attached to opposing surfaces of component 11 via conduits 3 and 4 or may be spaced therefrom. The pulsed fundamental wave produced by tube 22 is increased, as in frequency-doubling. The modulating voltage on component 11 produces a harmonic of the fundamental wave and it can be collimated and is coherent to the same extent as the fundamental wave.

Other laser systems for utilizing the optical monocrystal component of the invention are also known; for example, see D. Roess "Lasers, Light Amplifiers and Oscillators" (1969), Academic Press Publishing Co., London and New York; U.S. Pat. Nos. 3,422,370; 3,457,417 or 3,508,164; all of which are incorporated herein by reference as shown useful systems that may include the non-linear optical component of the invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

We claim as our invention:

1. A non-linear optical component for frequency control of electro-magnetic radiation in the infra-red, visible and ultra-violet spectrum range comprising a monocrystal composed of barium nitrite hydrate and means for changing the optical properties of said monocrystal.

2. A non-linear optical component as defined in claim 1 wherein said means includes a pair of electrodes, each mounted on an opposing surface of said monocrystal.

3. In a laser system including means for producing electro-magnetic radiation in the infrared, visible and ultra-violet spectrum range and a means for frequency control of said electro-magnetic radiation, the improvement comprising that said means for frequency control comprises a non-linear monocrystal optical component composed of barium nitrite hydrate.

4. A method of obtaining a harmonic frequency of a basic frequency of electromagnetic radiation in the infrared, visible and ultra-violet spectral region comprising:
projecting electromagnetic radiation of a basic frequency through a non-linear optical component having a monocrystal composed of barium nitrite hydrate which emits a harmonic frequency of said basic frequency.

5. A method of controlling a beam of electromagnetic radiation in the infrared, visible and ultraviolet spectral region comprising:
projecting a beam of electromagnetic radiation through a non-linear optical component having a monocrystal composed of barium nitrite hydrate; and
changing the optical properties of said monocrystal by applying a voltage to electrodes disposed on said monocrystal so that the characteristics of said beam are changed in response to the changes in the optical properties of said monocrystal.

* * * * *